UNITED STATES PATENT OFFICE.

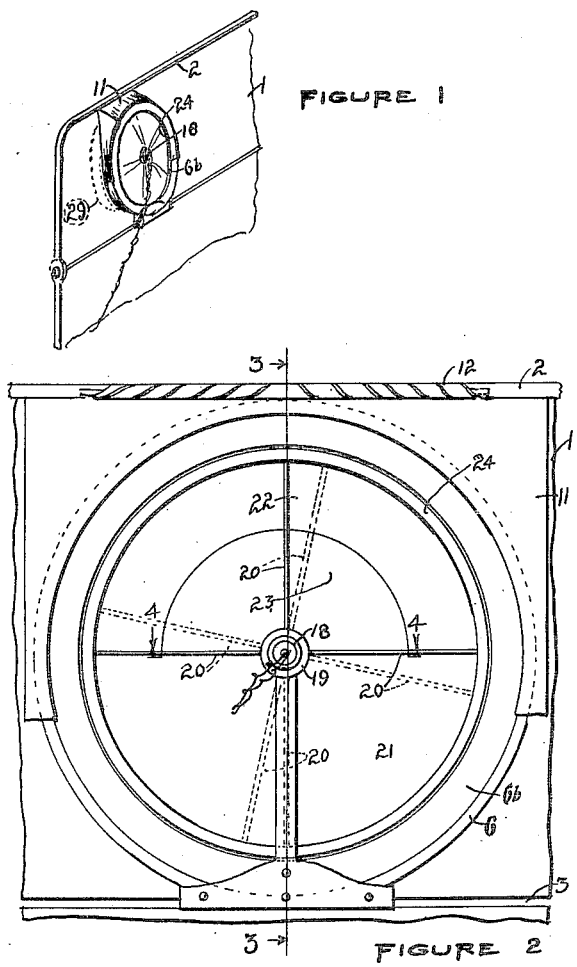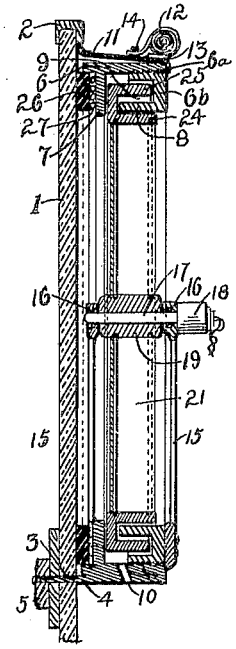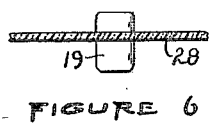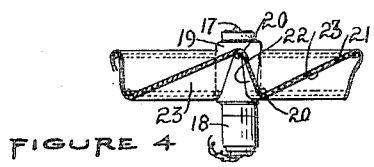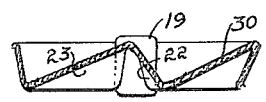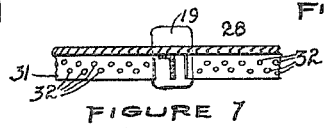

SAMUEL J. DREW, OF SAN JOSE, CALIFORNIA.

WINDOW OR WIND-SHIELD PROTECTOR.

1,319,516.  Specification of Letters Patent.  Patented Oct. 21, 1919.

Application filed March 24, 1919. Serial No. 284,800.

*To all whom it may concern:*

Be it known that I, SAMUEL J. DREW, a citizen of the United States, and resident of San Jose, in the county of Santa Clara and State of California, have invented certain new and useful Improvements in Window or Wind-Shield Protectors, of which the following is a specification.

My invention relates to a device for preventing the accumulation of moisture, dust, etc., upon an automobile windshield or similar article whereby a clear field of vision is secured to the operator of the machine under any and all atmospheric conditions.

The object of my invention is to provide a device of the nature indicated that will be applicable to any form of windshield or window, that will be easy to place in position or remove therefrom, simple in operation and highly efficient in its practical application.

In the drawings:—

Figure 1 is a perspective view of the device in position on a windshield.

Fig. 2 is a front elevation of the device.

Fig. 3 is a sectional view on line 3—3 of Fig. 2.

Fig. 4 is a sectional view on line 4—4 of Fig. 2.

Fig. 5 is a sectional view corresponding to 4—4 of Fig. 2 but with another form of rotor.

Figs. 6 and 7 are still further embodiments of my invention.

In the drawings, 1 indicates a windshield of an automobile, 2 being the protector upon its upper edge and 3 the space between the adjacent edges of the upper and lower panes of the shield. At 4 is shown a member passing through space 3 and securely fastened by a washer and nut 5 or in any other suitable manner. Upon member 4 is rigidly supported a circular casing 6 having an inwardly projecting flange 7 and having its front edge threaded as 6ª to receive threaded band 6ᵇ and having its front edge bent inwardly and backwardly as at 8 to form a pocket 9. At the bottom of pocket 9 is formed vent 10. An awning 11 is secured to edge 2 and passes over casing 6 as shown and to which it is securely fastened. A drop curtain 12 is also secured to the top of casing 1 as shown at 13 in Fig. 3 and buttons thereto at 14 when not in use.

On supporting member 3 and casing 6 are arms 15 provided with ball bearings 16 in which operates a shaft 17 driven by a suitable electrical drive 18, the connections to the same not being shown. Secured to shaft 17 is a hub 19 carrying wire spokes 20, the same being staggered as shown and preferably placed in pairs with a transparent material such as isinglass or celluloid 21 woven about the said spokes so as to present alternately short and long exterior surfaces as indicated at 22 and 23 respectively. The isinglass 21 is cemented to hub 19 at its inner edge and to rim 24 at its outer edge, the rim 24 being supported on spokes 20 and having an outwardly and forwardly turned flange 25 which engages pocket 9 in casing 6. A rubber gasket is shown at 26 having a wire spring 27 inserted behind it for the purpose hereinafter described.

In its practical application the device is mounted as above described and as shown in Fig. 3, the spring 27 keeping gasket 26 always in contact with glass 1 and absorbing most of the jar that would otherwise be transmitted to the device. The awning 11 at all times prevents the entrance of dust or water behind the device, and may also serve as an anchor to assist in holding the device in position.

The roll curtain 12 may be dropped to cover the front of the device when not in use and thereby prevent the settling of dirt upon the same. If water makes its way into the casing through the small crack between the same and rim 24 it will work its way down to the bottom of casing 6 and pass out through orifice 10.

When hub 19 is caused to revolve rapidly the transparent member mounted thereon revolves so rapidly that dirt or dust cannot settle thereon, and particles of mist or rain are caused to coalesce into a single film of water which does not obscure the vision. The spokes 20 revolve so rapidly that they do not interfere with vision through the device.

While the desired result may be secured by means of a flat member as 28 in Fig. 6, I prefer to use the form shown in Fig. 4 because this form creates a positive turbulence of the air directly in front thereof which effectually prevents the settling of rain drops or dust upon the member in such a manner as to obscure the vision. While this revolving member has been described as having isinglass wound in and out through the spokes, a similar form may be secured by casting the member all in one piece out of a suitable material such as glass, and as indicated at 30 in Fig. 5.

In the form shown in Fig. 7, radially positioned flanges as 31 are secured to the face of the rotor 28, each flange being freely perforated as at 32. The forcing of air through the perforations 32 increases the disturbance of the air and causes small air jets to play against the outer surface of the transparent member thereby increasing the effectiveness of the device.

The dotted lines at 29 in Fig. 1 indicate a second device of the nature described secured to the inner surface of the windshield and in alinement with the device on the outer surface.

It is understood that changes in form, size, construction, proportion or operation may be made within the scope of the appended claims.

I claim:

1. A device of the character indicated, comprising a casing, means for mounting the same in an operative position upon a transparent member, and a rotor operatively mounted in said casing, said rotor having staggered spokes arranged in pairs and connecting its hub and rim, and a transparent material woven through said spokes and entirely filling the space between said hub and rim.

2. A device of the character indicated comprising a casing, and means for mounting the same in an operative position on a transparent member, resilient means for connecting the outer edge of the casing with said member, a rotor operatively mounted in said casing, said rotor having a continuous transparent material inserted therein and extending from the rim to the hub thereof.

3. A device of the character indicated comprising a casing, and means for mounting the same in an operative position on a transparent member, water-proofed material connecting the upper portion of said casing and said member, resilient means for connecting the outer edge of the casing with said member, a rotor operatively mounted in said casing, said rotor having a continuous transparent material inserted therein and extending from the hub to the rim thereof.

4. A device of the character indicated comprising a casing and means for mounting the same in an operative position on a transparent member, water-proofed material connecting the upper portion of said casing and said member, a drop curtain mounted on said casing, a rotor operatively mounted in said casing, and a transparent material filling the space between the hub and rim of said rotor.

5. A device of the character indicated comprising a casing having an annular pocket formed therein, means for mounting said casing on a transparent member, a rotor operatively mounted therein and having a rim adapted to engage said pocket, said rotor having a body portion of transparent material, said casing having a drain formed therein.

SAMUEL J. DREW.